(12) United States Patent
Shehri et al.

(10) Patent No.: US 11,953,352 B2
(45) Date of Patent: Apr. 9, 2024

(54) NON-METALLICS ENHANCED RELIABILITY VIA EMBEDDED SENSORS (NERVES): OPTICAL AND ELECTRICAL SENSORY NERVES

(71) Applicant: Saudi Arabian Oil Company, Dhahran (SA)

(72) Inventors: Ali Al Shehri, Thuwal (SA); Faisal AlThenayan, Dhahran (SA); Kamal Youcef-Toumi, Cambridge, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 184 days.

(21) Appl. No.: 17/653,216

(22) Filed: Mar. 2, 2022

(65) Prior Publication Data
US 2022/0349732 A1 Nov. 3, 2022

Related U.S. Application Data

(60) Provisional application No. 63/182,401, filed on Apr. 30, 2021.

(51) Int. Cl.
*G01M 3/38* (2006.01)
*F16L 11/08* (2006.01)
*G01D 5/353* (2006.01)
*G16Y 10/35* (2020.01)
*G16Y 20/20* (2020.01)
*G16Y 40/10* (2020.01)

(52) U.S. Cl.
CPC .......... *G01D 5/35316* (2013.01); *G01M 3/38* (2013.01); *G16Y 10/35* (2020.01); *G16Y 20/20* (2020.01); *G16Y 40/10* (2020.01)

(58) Field of Classification Search
CPC ...... G01D 5/26; G01D 5/353; G01D 5/35316; G01M 3/00; G01M 3/38; G16Y 10/35; G16Y 20/20; G16Y 40/10; F16L 11/00; F16L 11/04; F16L 11/08
See application file for complete search history.

(56) References Cited

U.S. PATENT DOCUMENTS 6,134,766 A * 10/2000 Sievert ............... G02B 6/52
405/183.5
10,209,060 B1  2/2019 Nguyen
(Continued)

FOREIGN PATENT DOCUMENTS

EP  2841835 B1 *  2/2019 ......... B29C 47/0023
GB  2541944 A  3/2017
(Continued)

OTHER PUBLICATIONS

Machine translation of KR-20020003896-A (Year: 2002).*
(Continued)

*Primary Examiner* — Nguyen Q. Ha
(74) *Attorney, Agent, or Firm* — Leason Ellis LLP

(57) ABSTRACT

A smart pipe segment for use in construction of a pipeline. The smart pipe segment includes a pipe body and a sensing nerve network that is associated with the pipe body and is configured to monitor a condition of the pipe segment in real-time. The sensing nerve network comprises optical nerves, electrical nerves or a combination thereof.

11 Claims, 4 Drawing Sheets

(56) References Cited

U.S. PATENT DOCUMENTS

| | | | | |
|---|---|---|---|---|
| 2002/0033554 A1* | 3/2002 | Heagy | ............... | F16L 55/165 |
| | | | | 264/269 |
| 2008/0273852 A1* | 11/2008 | Parker | ............... | G01J 5/0821 |
| | | | | 385/128 |
| 2013/0220468 A1* | 8/2013 | Weppenaar | ............ | F16L 11/12 |
| | | | | 138/104 |

FOREIGN PATENT DOCUMENTS

| | | | | |
|---|---|---|---|---|
| KR | 20020003896 A * | 1/2002 | ............... | F16L 9/12 |
| WO | 2010055324 A1 | 5/2010 | | |
| WO | 2012062328 A1 | 5/2012 | | |

OTHER PUBLICATIONS

International Search Report and Written Opinion in Corresponding PCT Application No. PCT/US2022/023332 dated Jun. 14, 2022.; 14 pages.

* cited by examiner

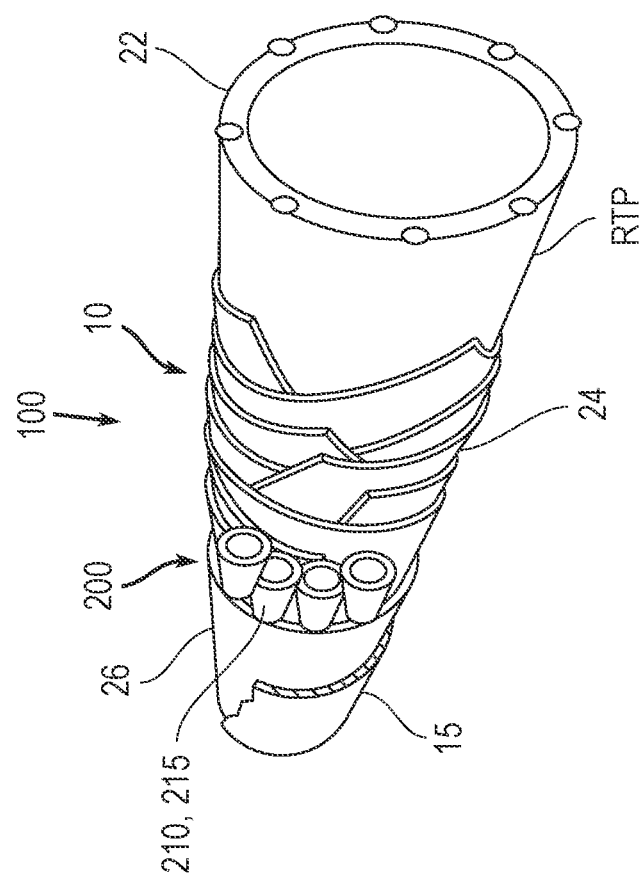
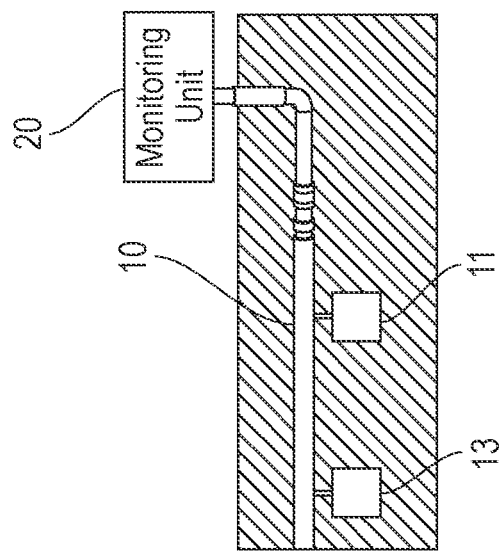
FIG. 1
FIG. 2

NON-METALLICS ENHANCED RELIABILITY VIA EMBEDDED SENSORS (NERVES): OPTICAL AND ELECTRICAL SENSORY NERVES

CROSS REFERENCE AS RELATED APPLICATION

The present application claims priority to and the benefit of U.S. patent application Ser. No. 63/182,401, filed Apr. 30, 2021, which is hereby incorporated by reference in its entirety.

TECHNICAL FIELD

The present invention relates to pipeline management and monitoring and more particularly, relates to a control and monitoring system that includes pipes that have integral optical and electrical sensory nerves to define a network of distributed sensors for process control (e.g., fluid connections).

BACKGROUND

Remote monitoring systems deliver improvements in the safety, reliability, and performance of industrial assets and equipment. These type of systems use real-time data from production assets to reduce unplanned downtime and increase asset reliability. Remote monitoring systems have many applications in industries that require a lot of equipment that operates from remote locations. The operator can monitor and collect data to know exactly where the assets and equipment are, how they are performing, and identify problems as they occur. The operator can also get real-time notifications on any critical events without the need to dispatch field personnel.

With respect to the oil and gas industry, pipelines are one of the most important assets. As such, pipelines are continuously monitored to ensure pipeline integrity and mitigate risk. For example, in order to detect a potential leak or other abnormality, the pipeline is monitored to track any changes in pressure, flow rate or temperature as well as other properties. In the event that an abnormality is detected, remedial action can be taken.

SUMMARY

The present disclosure is directed to a smart pipeline that includes a main controller (monitoring unit) and provides the following features: 1) failure and leak detection; 2) real time monitoring; 3) prognosis; 4) load and anomalous pressure monitoring; and 5) identification of exact damage location along the pipeline, etc. The smart pipeline can either be manufactured to include such capabilities or it can be retrofitted onto existing pipelines.

In one embodiment, the smart pipeline includes a sensing nerve network that is associated with the pipeline and is configured to monitor a condition of the pipeline in real-time. The sensing nerve network comprises optical nerves, electrical nerves or a combination thereof, and in one embodiment, the nerves are helically oriented relative to the pipeline.

BRIEF DESCRIPTION OF THE DRAWING FIGURES

FIG. 1 is a perspective view of a pipe segment of the pipeline with an integral sensing nerve network;

FIG. 2 is a side view of a buried pipeline with a pipeline monitoring system;

DETAILED DESCRIPTION OF CERTAIN EMBODIMENTS

In accordance with the present disclosure, a pipeline monitoring system 100 is provided and is configured to be implemented in a pipeline to permit continuous real-time monitoring of a pipeline that is generally shown at 10 in the figures. As is known, a pipeline is made up of a series of pipe segments that are joined together to form a longer pipeline through which fluid (e.g., a hydrocarbon) flows from one location to another location. In this way, the pipeline 10 can be considered to be a smart pipeline that is configured to monitor ongoing conditions and communicate with a main controller that is typically remotely located relative to the pipeline. In particular, the main controller is most often located above ground as an interrogating station and readout unit (data driven) and is preferably wirelessly connected to operators through IoT protocol.

Such continuous real-time monitoring of the pipeline 10 ensures pipeline integrity, immediate leak detection, accurate leak location and risk mitigation, etc. As discussed herein, the integral incorporation of a sensing nerve network along the pipeline 10 permits remote monitoring of a number of pipeline related measurements that are of importance in understanding the health of the pipeline. For example, the pipeline 10 can be monitored in real time using the sensing nerves to track any change in pressure, flow rate, temperature, as well as other operating parameters or external parameters.

Figure 4:
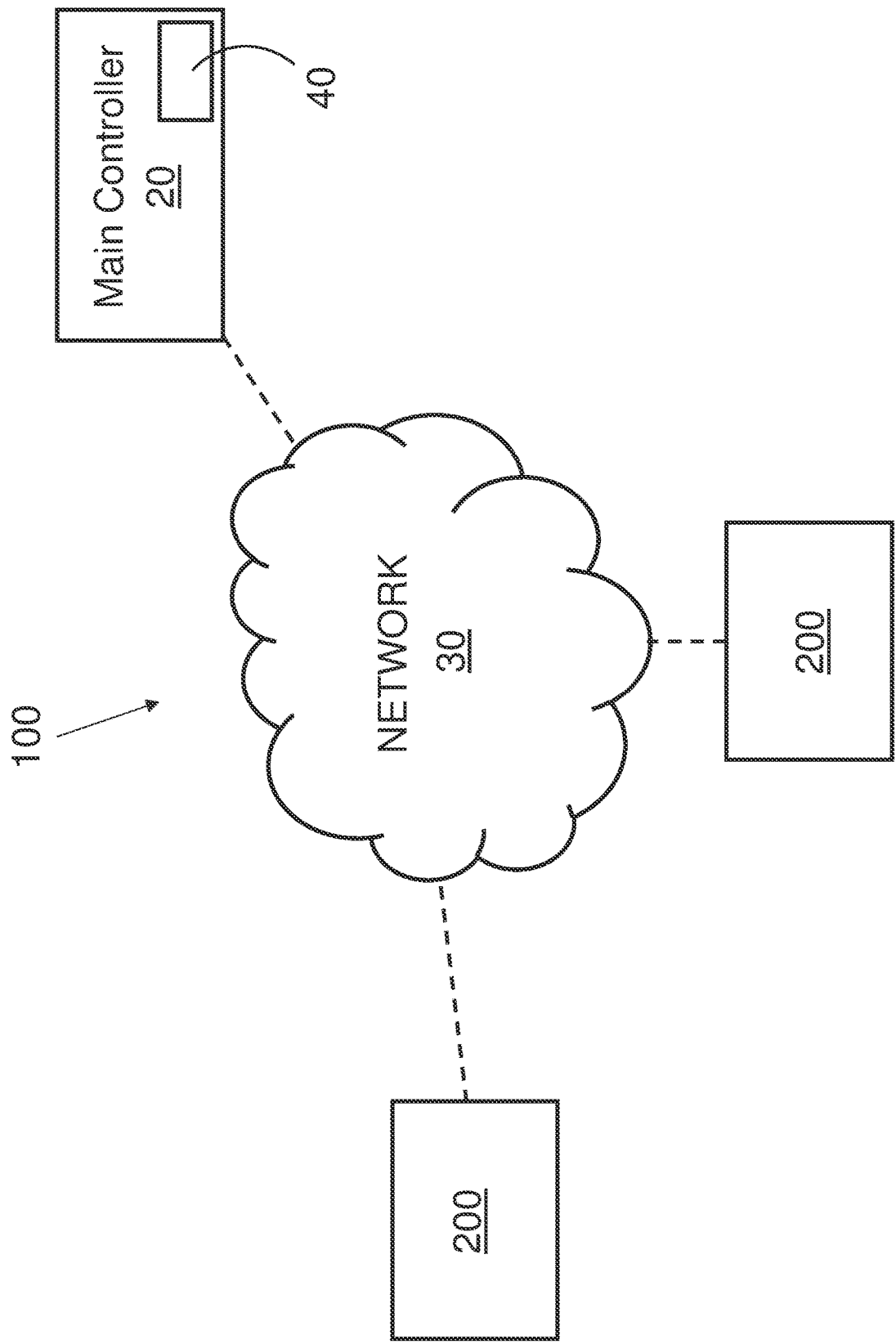
FIG. 4 is a schematic of the pipeline monitoring system.

As shown in the general schematic of FIG. 4, the pipeline monitoring system 100 is an automated system that includes a main controller (main processor) 20 that permits the user to control various aspects of the operation of the automated pipeline monitoring system 100. In one aspect, the pipeline monitoring system 100 can be of a type that communicates over a communications network 30 to allow the various components to speak with the main controller and/or to communicate directly with one another. In addition, the main controller 20 serves to receive data (measurements) from the sensing nerve network which is described herein and is configured to alert the user as to any abnormalities detected from such received data (measurements). The main controller 20 is located above ground at a desired location and communicates to other remote computing devices over the communications network 30.

Various forms of computing devices are accessible to the network 30 and can communicate over the network 30 to the various machines that are configured to send and receive content, data, as well as instructions that, when executed, enable operation of the various connected components/mechanisms. The content and data can include information in a variety of forms, including, as non-limiting examples, text, audio, images, and video, and can include embedded information such as links to other resources on the network, metadata, and/or machine executable instructions. Each computing device can be of conventional construction, and while discussion is made in regard to servers that provide different content and services to other devices, such as mobile computing devices, one or more of the server computing devices can comprise the same machine or can be spread across several machines in large scale implementations, as understood by persons having ordinary skill in the art. In relevant part, each computer server has one or more processors, a computer-readable memory that stores code that configures the processor to perform at least one function, and a communication port for connecting to the network 30. The code can comprise one or more programs, libraries, functions or routines which, for purposes of this specification, can be described in terms of a plurality of modules, residing in a representative code/instructions storage, that implement different parts of the process described herein. As described herein, each of the robotic devices (tools) has a controller (processor) and thus, comprises one form of the above-described computing device.

Further, computer programs (also referred to herein, generally, as computer control logic or computer readable program code), such as imaging or measurement software, can be stored in a main and/or secondary memory and implemented by one or more processors (controllers, or the like) to cause the one or more processors to perform the functions of the invention as described herein. In this document, the terms "memory," "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like. It should be understood that, for mobile computing devices (e.g., tablet), computer programs such as imaging software can be in the form of an app executed on the mobile computing device.

The pipeline monitoring system 100 can include a graphical user interface (GUI) 40 that can be provided to allow for remote control over the pipeline monitoring system 100. As is known, the GUI 40 is a system of interactive visual components for computer software. A GUI displays objects that convey information and represent actions that can be taken by the user. The objects can change color, size, or visibility when the user interacts with them. GUI objects include icons, cursors, and buttons. These graphical elements are sometimes enhanced with sounds, or visual effects like transparency and drop shadows.

The graphical user interface 40 typically includes a display, such as a touch screen display, to allow user input to be registered and then steps are taken by the main processor 20.

IoT Protocol

The main controller 20 can thus be a control unit that is located above the ground and acts as an interrogating and readout station that is data driven and wirelessly connected to operators (via remote computing devices) through IoT protocol. As is known, IoT communication protocols are modes of communication that protect and ensure optimum security to the data being exchanged between connected devices. The IoT devices are typically connected to the Internet via an IP (Internet Protocol) network. IoT can thus be considered to be an interdisciplinary field that allows a wide range of devices, from the smallest sensors to industrial machines, to communicate and affect each other close to real-time. The evolution of IoT has removed the dependency of processing data on a centralized server and instead replaces it with a more decentralized solution where each device can be considered a client as well as a server.

Sensing Nerve Network 200

As mentioned herein, the pipeline monitoring system 100 includes an integral sensing nerve network 200 that communicates with the main controller 20 (e.g., as by communication over the network 30). The sensing nerve network 200 is configured to provide real-time, continuous monitoring of the pipeline 10. As described herein, the sensing nerve network 200 is intimately associated with the pipeline 10 either by integrally incorporating the sensing nerve network 200 into the pipeline 10 at the time of manufacturing of the pipeline segments or the system 200 can be part of a retrofit solution in which the sensing nerve network 200 is applied to the current installed pipes.

As described herein, the sensing nerve network 200 can be formed of one or more types of sensing elements (sensors) and in one embodiment, the sensing nerve network 200 is a hybrid network formed of at least two different types of sensing elements.

The sensing nerve network 200 is designed to detect failure and leaks along the pipeline 10; provide real-time monitoring; prognosis; load and anomalous pressure monitoring; and permit the exact damage location along the pipeline 10 to be identified.

Optical Nerves

At the least of network 200 are the sensing (nerve) network.

The sensing elements that can be part of the sensing nerve network 200 can be in the form of optical nerves 210 that take the form of optical fibers that are incorporated into the pipes and extend along a length thereof. As is known, an optical fiber is a flexible, transparent fiber that is made by drawing glass (silica) or plastic to a diameter that is slightly thicker than that of a human hair. Optical fibers are used most often as a means to transmit light between the two ends of the fiber and they find wide usage in fiber-optic communications, where they permit transmission over longer distances and at higher bandwidths (data transfer rates) than electrical cable. With optical fibers, light travels down a fiber optic cable by bouncing off the walls of the cable repeatedly. Each light particle (photon) bounces down the pipe with continued internal mirror-like reflection. The light beam travels down the core of the cable. The core is the middle of the cable and the glass structure. The cladding is another layer of glass wrapped around the core. Cladding is there to keep the light signals inside the core. Fiber optic cables carry light signals in modes. A mode is a path that the light beam follows when traveling down the fiber. There are single mode and multimode fiber cables. Multimode fiber is the other type of fiber optic cable. It is about 10 times larger than a single mode cable. The light beams can travel though the core by following a variety of different paths, or in multiple different modes.

Thus, an optical fiber transmits data by light to a receiving end where the light signal is decoded as data.

The optical nerves 210 can thus be in the form of plastic or glass optical fibers.

The optical nerves 210 (fiber optic sensors) are thus part of a fiber optic sensing arrangement that utilizes fiber optics to realize the orientation and position of the optical fiber relative to its starting point or realizing the shape of an object with embedded fiber optic sensors as in the present application. For example, fiber optic sensors are mainly based on directional strain measurements. As an example, a fiber optic sensor can consist of a tri-core fiber Bragg gratings sensor planes that measure strain for multi-dimensional bend direction calculation of an object which can then be consequently used in a computer model to reconstruct the 2D/3D shape of the object.

Some of the advantages of using optical nerves 210 are the following: 1) inexpensive (cost); 2) narrow bandwidth but are excellent for the sensing application described herein; 3) highly sensitive; and 4) signal mismatch and time of flight indicates the location of damage.

As shown in FIG. 1, the optical nerves 210 can be disposed circumferentially about the pipes of the pipeline 10. In general, the pipes forming the pipeline include an inner pipe body that defines the center bore through which fluid flows and the optical nerves 210 are disposed circumferentially and in an outer radial direction relative to the bore. FIG. 1 shows one exemplary pipe segment 22 that makes up the pipeline 10. The pipe segment 22 can have a traditional construction and as shown, the pipe segment 22 includes a reinforced thermoplastic pipe (RTP) that constitutes the innermost portion of the pipe segment 22. As is known, RTP is a generic term that refers to a reliable high strength synthetic fiber, such as glass, aramid, or carbon. The next layer or part of the pipe segment 22 can be a reinforcing element 24, such as reinforcing steel, that surrounds the RTP 22. The optical nerves 210 (e.g., optical fibers) are disposed circumferentially about the reinforcing element 24. Finally, an outer cover or shield 26 is provided and covers the optical nerves 210. The outer shield 26 comprises a corrosion resistant shield that is formed of a suitable corrosion resistant material. As described herein, the outer shield 26 can be disposed over the sensing nerves using any number of suitable techniques. For example, as mentioned herein, an additive manufacturing technique can be used. Alternatively, the outer shield 26 can be formed over the nerves using other manufacturing techniques. For example, the nerves can be laid (wound) over the underling pipe segment structure and then the outer shield 26 can be formed over the nerves.

In FIG. 1, the optical nerves 210 are preferably evenly distributed and cover the circumference of the pipe segment to increase the detection probability as a function of location and provides multi sensing nodes verification outputs.

With respect to fiber Bragg grating sensors (FBGs), these types of sensors can be used in deformation measurement of large structures due to their small size, light weight, strong anti-electromagnetic interference ability and self-tuning function. FBG uses wavelength coding, which is slightly affected by the fluctuation of system light source and external factors. It is suitable for online measurement of stress, strain and temperature outside or inside the structure in a complex environment. As such, it can be implemented in a pipeline environment as discussed herein.

Traditional fiber optic sensors are designed to only transmit signals. These sensors are non-intrinsic fiber optic sensors. FBGs not only transmit signals, but they also sense signals. It is an intrinsic fiber optic sensor. FBG is written by ultraviolet rays in the fiber core, the written grating area has a strong sense of physical signals in the external environment. For reflective gratings, when the light source passes through the grating area, the wavelength is equal to the amount of light reflected back from the Bragg center wavelength, and the light of other wavelengths passes through the grating area. The working principle of FBG sensor utilizes the changes of the physical environment around the FBG sensor such as stress, strain and temperature to form the grating period or fiber core refractive index changes. Such changes make the central wavelength of Bragg grating shift, and a mathematical model is established through the center wavelength shift and measurement. Then the variation of stress and strain can be obtained.

The above-described fiber optic sensors are thus designed to operate in harsh environments and are highly accurate and capable of identifying minute changes in the wavelength of light which is correlated to the changes in the parameters being measured. With excellent signal-to-noise ratio and very low signal degradation over long distances, these types of sensors enable precise measurements of parameters such as temperature, strain, vibration, pressure, etc. More specifically, fiber optic sensor cables (e.g., optical nerves 210) are capable of measuring the following parameters:

Temperature
Pressure
Liquid Level
Strain
Vibration
Displacement
Tilt
Load.

The use of optical fibers taps into the power provided by modulated optical waves that reflect from the core of the optical fibers. Light that travels through the core of the fiber is modulated by changes in the surrounding environment such as temperature, pressure, and mechanical strain. This modulation, which occurs in the form of changes in shape or wavelength of light, is correlated to the measurement parameters. In combination with Wavelength Division Multiplexing (WDM) technology, these optical signals are mapped to physical locations along the fiber optic cable, thereby enabling multi-point sensing along the length of the optical fiber (cable).

Figure 5:
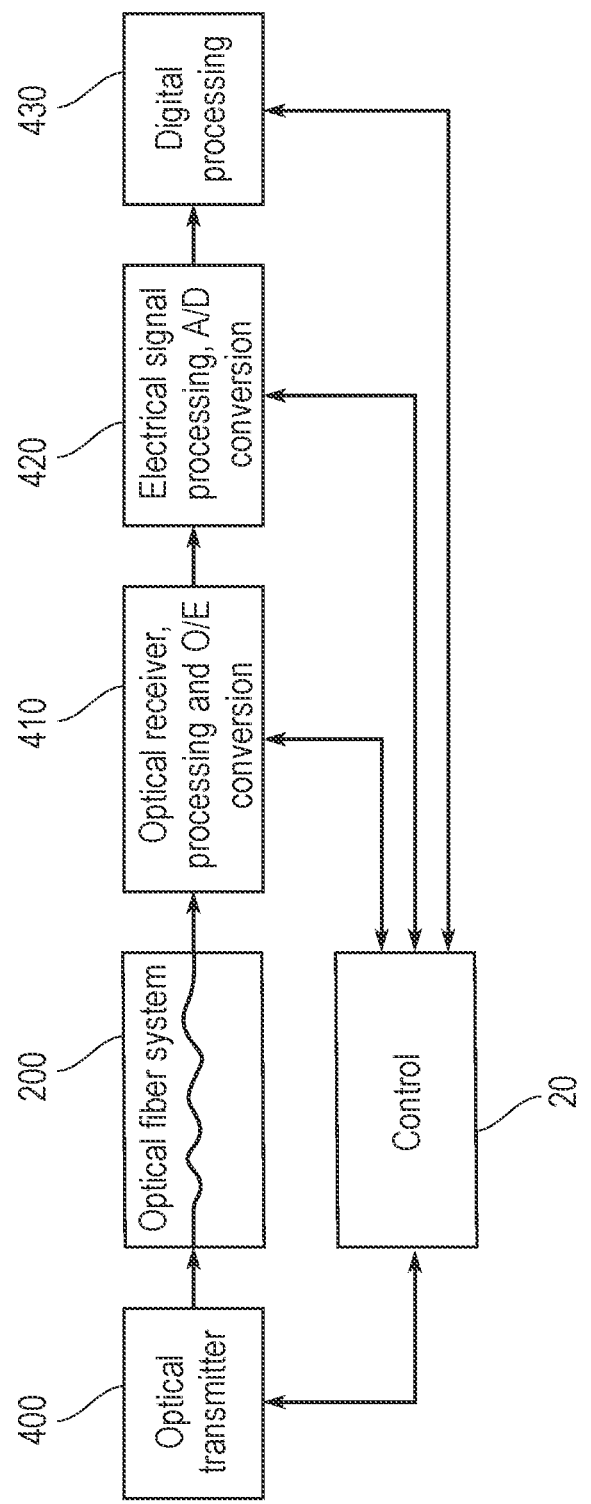
FIG. 5 is a schematic of an optical fiber-based sensing system.

It will also be appreciated that a basic fiber optic sensor generally consists of a number of components including the optical fiber itself. In one embodiment, the fiber optic sensor includes an optical source (e.g., LED, laser, etc.), the optical fiber, a sensing element, optical detector and end processing devices (e.g., optical-spectrum analyzer, oscilloscope, etc.). The optical fiber sensors are generally divided into two categories: thru-beam and reflective. The dint-beam type comprises a transmitter and a receiver. The reflective type, which is a single unit, is available three types: parallel, coaxial, and separate. The three types are based on the shape of the cross-section of the optical fiber, One type is a coaxial which is a high-precision type, consisting of a core (transmitter) and surrounding area (receiver). These principles can be implemented in the present system, FIG. 5 shows an exemplary optical fiber-based sensing system that can be used in the applications described herein.

The system includes an optical transmitter 400 that typically consists of a light source (mainly a laser) and, in the majority applications, also a modulator, amplifiers, filters, and other components to generate a required form of the light signal at an appropriate power level and with a required spectrum. In most cases, the monochromatic and very stable, i.e., a highly coherent, light source is required to obtain high sensor sensitivity and the required accuracy.

The optical fiber system 200 has been described previously herein and includes one or more fiber segments and the other components, such as optical splitters, couplers, isolators, circulators, and some schemes also contain polarization controllers, polarization splitters, prisms, lenses, and mirrors.

The box 410 represents an optical receiver, processing, and O/E conversion block commonly includes optical amplifiers, optical filters, and/or a block of coherent detection that may precede an o/e converter. The o/e converter changes a stream of photons into an electrical signal, i.e., current or voltage. The converter may have a form of one photodetector (a photodiode mostly), or a form of the balanced photodetector (a couple of matched photodiodes connected as a differential circuit) in the case of heterodyne coherent detection schemes.

The box 420 represents an electrical signal processing and A/D conversion block further processes the electrical signal and converts it to the digital form. Electrical amplifiers, filters, and, optionally, mixers are included before an A/D conversion.

The box 430 represents a digital processing block processes the digital signal fora to get the required information that the sensor is designed to provide.

The controller 20 has been previously described and is a master controller that controls the whole measurement process as described herein and receives inputs from the various components and can output and communicate with external equipment as described herein.

Electrical Nerves

The sensing elements that are part of the sensing nerve network 200 can be in the form of electrical nerves 215 that take the form of electrical fibers that are incorporated into the pipes and extend along a length thereof. Any number of suitable electrical fibers, such as copper fibers, can be used and function as electrical conductors that carry electrical pulses. The electrical nerves 215 can thus take the form of coaxial transmission lines.

Some of the advantages of using electrical nerves 215 are that the installation process is easier and less critical; high temperature computability; inexpensive cost; and can be used for communication due to large bandwidth (another application in the same time).

With reference to FIG. 1, it will be appreciated that some or all of the optical nerves 210 in FIG. 1 can be replaced with the electrical nerves 215. In other words, the electrical nerves 215 can be disposed circumferentially over the reinforcing element 24 and below the outer shield 26.

Hybrid Nerve Network

In another embodiment, the sensing nerve network 200 can be a hybrid system that includes both optical nerves 210 and electrical nerves 215. As is known, distributed sensing is a technology that enables continuous, real-time measurements along the entire length of the optical fiber. The distribution of optical nerves 210 and the electrical nerves 215 can be selected according to a prescribed desired pattern. For example, the optical nerves 210 and electrical nerves 215 can be arranged in an alternating manner and arranged in a circumferential manner about the pipe segment. Other designs/orientations are equally possible such as arranging the optical nerves 210 and electrical nerves 215 in different regions or zones. For example, two or more optical nerves 210 can be disposed circumferentially about the pipe segment in a first region and then two or more electrical nerves 215 can be disposed circumferentially about the pipe segment in an adjacent second region, etc.

Helix (Spiral) Configuration of Nerves

In one embodiment, the optical nerves 210 and/or electrical nerves 215 are wound in a helical nature about the pipeline 10.

It will be appreciated that the most common distributed optical fiber orientations for a pipeline are: 1) mounted or embedded in circumferential (hoop) direction; 2) axial (longitudinal) direction; and 3) helical (spiral) directions along the pipeline.

In one embodiment, the system can be configured to provide real-time, continuous temperature and acoustic/vibration data along the entire sensor (fiber optic) length. The sensing nerve network 200 for the pipeline 10 provides the capability to monitor the entire downstream process 24/7. The sensing nerve network 200 allows for other technologies to be utilized as part of the monitoring process. For example, distributed temperature sensing (DTS) and distributed acoustic sensing (DAS)/distributed vibration sensing (DVS) technologies can be utilized as part of a pipeline monitoring system. As mentioned, the fiber optic (cable) acts as the sensor and can provide continuous temperature and acoustic monitoring. The sensing nerve network 200 can detect and accurately locate changes in temperature, noise, vibration, and strain around a pipeline based on feedback received from the fiber optic sensor. These changes are most likely caused by leaks or third party interference (TPI) events such as pipeline theft or digging.

As is known, wavelength modulated sensors are based on the principle that a physical disturbance such as temperature or strain changes the reflected wavelength of the light. When the temperature of the optical fiber changes both the spacing between the gratings and the refractive index will change.

Accordingly, the technology of the present system harnesses the power of modulated optical waves reflected from the core of the optical fibers. Light that travels through the core of the fiber is modulated by changes in the surrounding environment such as temperature, pressure, and mechanical strain. That modulation—occurring in the form of changes in shape or wavelength of light—is correlated to the measurement parameters. By leveraging Wavelength Division Multiplexing (WDM) technology, the optical signals are mapped to physical locations along the fiber optic cable. This method enables multi-point sensing along the length of the fiber optic cable. Thus, the precise location at which an anomaly occurred can be mapped and flagged for human intervention and investigation.

Leak Detection

Loss of transported medium due to pipeline leaks typically results into one or more of the following detectable effects: 1) local cooling; 2) soil temperature change due to temperature difference between soil and emanated fluids and due to evaporation effects; and 3) the generation of detectable sounds from the emanating medium especially in high pressure applications. These detection methods are based on scientific principles, such as the Joule-Thomson effect and Raman or Brillouin scattering effects.

Ground Movement Detection and Monitoring of Structural Health

Geohazards like earthquakes, landslides and surface subsidence result into ground movement and thus put additional stress on the pipelines. Distributed fiber optic strain sensors can be applied to identify the endangering ground movements. Strain sensing fibers, such as those described herein, that are attached directly to the pipeline walls measure the walls' strain changes and to conclude on the consequential movements and deformations.

Third Party Activities

The majority of all reported pipeline leak incidents are caused by third party activities including construction and agricultural works, illegal tapping and intentional damaging. By applying distributed strain sensing sensor (optical fibers) or even interferometer based hydrophones along the pipeline as described herein, it is possible to detect approaching heavy earth working machines, actual digging, metallic contact with the pipeline and other sound and vibration signals. Because knowing the exact location of the event, immediate response could prevent illegal tapping and consequential environmental and financial damages.

Based on the foregoing, it will be appreciated that the sensing nerve network 200 is configured to provide distributed temperature and acoustic sensing. There can be quantitative measurement of the noise/vibration and strain amplitude over extended distances.

The software and operating systems associated with the sensing nerve network 200 includes an alarm or alert mode in which the operator is alerted to a condition that falls outside of normal operating conditions. Numerous algorithms can be provided for detecting even small leaks and local events based on the measured data provided by the sensing nerve network 200. The alerts can be in the form of visual alerts on the screen and/or auditory alerts and present information such as the location of the event to allow the operator to dispatch personnel to that location or otherwise conduct additional investigation.

Manufactured Pipeline

It will be understood that according to one embodiment, as shown in FIG. 1, the sensing nerve network 200 can be provided and integrated into the pipe segment at the time of manufacture/assembly of the pipe segment. In other words, during the layout of the pipes in the factory, the sensing nerve network 200 can be installed. As mentioned herein, the pipe segment is made up of a number of layers and the sensing nerve network 200 can be incorporated and laid over the pipe body before application of the outer shield 26.

There are many techniques that can be used to incorporate the sensing nerves into the manufactured pipeline 10. For example, the sensing nerves can be embedded in the pipeline 10 during the manufacture thereof.

Additive manufacture is one suitable technique for the fabrication of the pipeline with integrated, embedded sensing nerves. As is known, additive manufacturing (AM), also known as 3D printing, is a transformative approach to industrial production that enables the creation of lighter, stronger parts and systems. Additive manufacturing uses data computer-aided-design (CAD) software or 3D object scanners to direct hardware to deposit material, layer upon layer, in precise geometric shapes. As its name implies, additive manufacturing adds material to create an object. More specifically, the term "additive manufacturing" references technologies that grow three-dimensional objects one superfine layer at a time. Each successive layer bonds to the preceding layer of melted or partially melted material. Objects are digitally defined by computer-aided-design (CAD) software that is used to create .stl files that essentially "slice" the object into ultra-thin layers. This information guides the path of a nozzle or print head as it precisely deposits material upon the preceding layer. Alternatively, a laser or electron beam selectively melts or partially melts in a bed of powdered material. As materials cool or are cured, they fuse together to form a three-dimensional object.

Accordingly, in one embodiment, additive manufacturing can be realized in the present application given the polymeric material nature of the nonmetallic pipes and the optical fibers (e.g., plastic optical fibers) and excellent printing compatibility.

It will be appreciated that one or more ends of the optical nerves 210 and/or electrical nerves 215 are in communication with the main controller 20 to allow transfer of data from the sensing nerve network 200 to the main controller. In one embodiment, the sensing nerve network 200 can be operatively connected to a transmitter unit that is configured to transmit data and the like to the main controller. Alternatively, a wired connection can be established between the sensing nerve network 200 and the main controller 20.

Retrofit Pipeline

Figure 3:
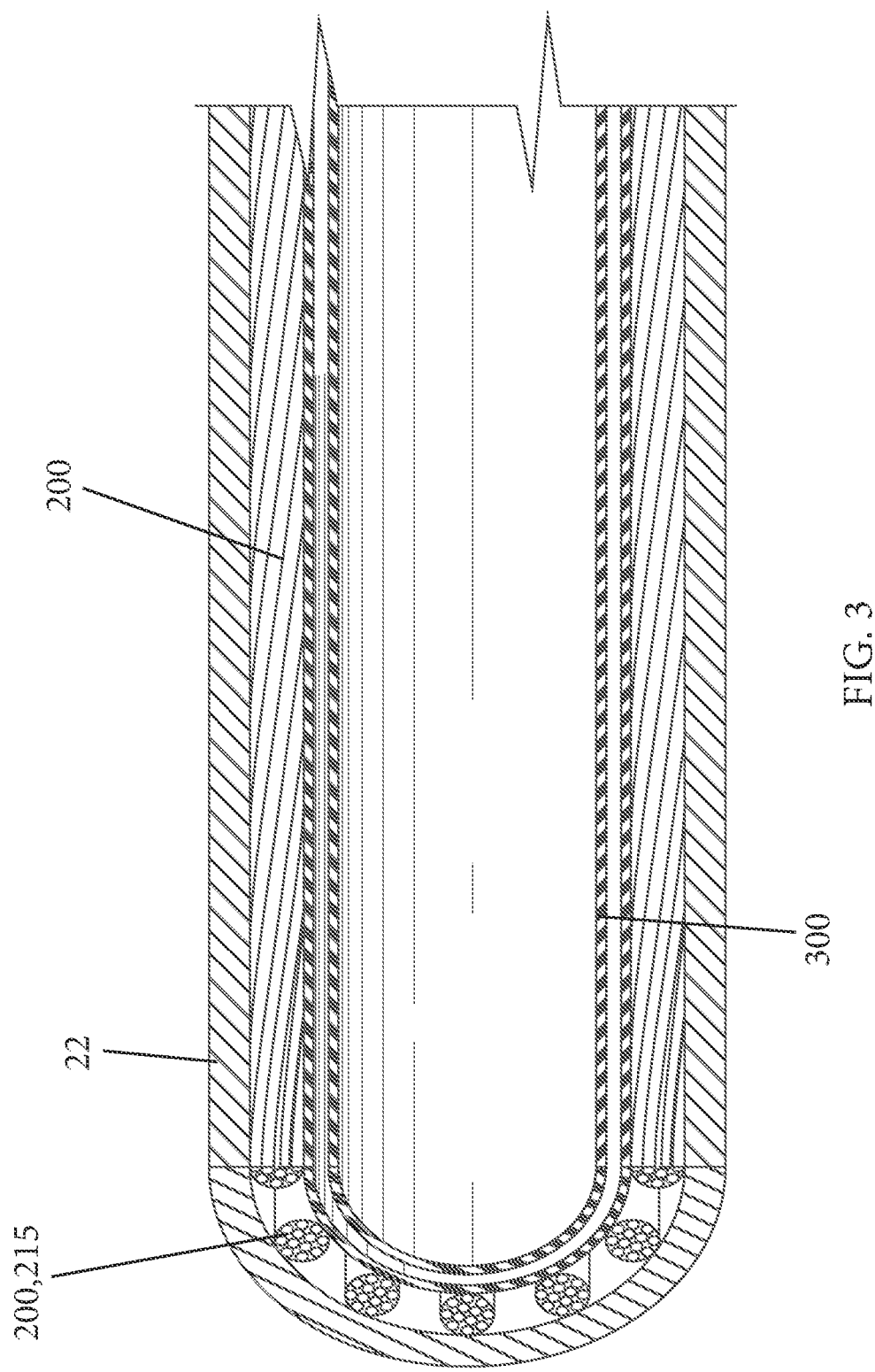
FIG. 3 is a cross-sectional view of a pipe segment with an integral sensing nerve network of an alternative embodiment.

In another aspect shown in FIG. 3, the sensing nerve network 200 can be applied to an existing (currently installed) pipeline 10. For existing pipelines, the sensing nerve network 200 can be incorporated internally within the bore of the pipe segment (pipeline) by disposing the sensing elements (optical fibers 210/electrical fibers 215) on an inflatable jacket 300. The inflatable jacket 300 is then inflated to insulate the pipe segment from the inside. The optical fibers 210 can thus be located along the outer surface of the inflatable jacket 300 with a longitudinal center bore defined therein. In one embodiment, the inflatable jacket 300 can be in the form of an inflatable rubber jacket. The installed inflated rubber jacket thus defines the inner bore through which the fluid flows with the sensing elements being located between the inflatable jacket 300 and the inner surface of the pipe segment itself. The sensing elements (fiber optics) are thus disposed between the inflatable jacket 300 and the pipe segment.

In this way an existing pipeline 10 that is buried in the ground or otherwise at the application site can be retrofitted with the sensing nerve network 200 by placing the sensing nerve network 200 internally within the pipe segments. Similarly, if the pipe segment which surrounds and radially outward from the sensing elements experiences some type of abnormality or undesired event, the sensing elements will detect such event and the location of such event.

In one embodiment, the sensing nerve network 200 can be formed of a ring-shaped interconnected structure made up of discrete fiber bundles (that can be helically oriented) that are connected to one another (e.g., as by connection of their outer jackets) using conventional techniques such as bonding. In such arrangement, this interconnected structure can be inserted into the pipe segment and then the inflatable jacket 300 can be inserted inside the interconnected structure or the interconnected structure can be disposed about the inflatable jacket and both are inserted into the pipe segment. Alternatively, the discrete fiber bundles can be associated with (anchored to) the outer surface of the inflatable jacket 300 in that the outer surface can include guides to assist in placing the fiber bundles or other techniques can be used to locate and retain the fiber bundles along the outer surface of the inflatable jacket 300 (e.g., the guides can be in the form of markings or ridges). In this way, the fiber bundles can be laid out longitudinally along the outer surface of the inflatable jacket 300.

In this retrofit design, it will be appreciated that external connections around the far ends of the pipe segments are required in order to operatively connect the sensing nerve network 200 of each pipe segment. In other words, the connectors can be of a type that establish a daisy chain type connection between the pipe segments 22 to allow the sensing nerves of the discrete pipe segments 22 to be operatively connected to one another to form a smart pipeline that is operatively connected to the main controller (monitoring unit) that is located above ground.

Once inserted, the inflatable jacket 300 is inflated to secure it in the pipe and define the center bore through which oil flows.

The smart pipeline described herein provides the following features: 1) failure and leak detection; 2) real time monitoring; 3) prognosis; 4) load and anomalous pressure monitoring; and 5) identification of exact damage location along the pipeline 10.

As illustrated and discussed herein, evenly distributed nerves cover the circumference of the pipe to increase the detection probability as a function of location and used as a multi sensing nodes verification outputs.

It will also be appreciated that while the pipeline 10 can be in the form of a buried pipeline, it can equally be in the form of an above-ground pipeline and as alternatively mentioned, the sensing nerve network can be installed internally.

Plastic (Polymer) Optical Fiber (POF)

As mentioned herein, the optical nerves 210 can be in the form of plastic or glass optical fibers. With plastic (polymer) optical fibers (POF), both the fiber core and the cladding is manufactured from a polymer. Superior flexibility (high alternate bending loads with smaller bending radiuses), connection and transmission technology that is less expensive than silica-based systems, and simple assembly in the field are key advantages of polymer optical fibers.

In accordance with the present system, these plastic optical fibers 210 provide the core of the composite-sensors integration of the system disclosed herein. More particularly, the present discloses describes the development of POF-based sensory nervous system embedded during the early layout manufacturing stage of nonmetallic reinforced thermoplastic pipes (RTP) pipes. The value propositions of this proposed system include, but are not limited to: (a) promote use of plastic sensors; plastic optical fibers in particular that are embedded for nonmetallic real time monitoring (sensors and targeted structures are made of the same composites, polymer-based); (b) cost effective providing cheap sensing channels; and (c) enhanced maintenance and monitoring of buried pipes, through IoT protocol.

POF-based sensors can thus detect pressure since the structure since their deformation results in a simultaneous change in transmitted light intensity which can be detected.

IoNs

As mentioned herein, the present disclosure describes a new paradigm shift in smart pipes structures driven by the internet of Things (IoT). More particularly, the system described herein can be referred to as the internet of nonmetallics (IoNs) since it is a tailored specific internet protocol for nonmetallic structures, such as plastic pipeline structures. Data analytics and AI (artificial intelligence) functions can be implemented to analyze sensing data and detect anomalous behavior of structures as described herein. The system is thus provided to monitor the status of the pipeline which, as mentioned, can be formed of nonmetallic material (plastics) and the use of the optical fibers, along with the other technology described herein, allows for signals to be transmitted along the pipeline. These signals are analyzed by the software running on the master controller (processor) to detect any anomalies that need to be investigated (e.g., as by leveraging Wavelength Division Multiplexing (WDM) technology) and more importantly, the location of the anomaly is recorded.

Manufacturability

In accordance with one aspect of the present disclosure, the intrinsically smart structures (smart pipes) can be manufactured using transparency-opacity materials techniques. Suitable manufacturing techniques include, but are not limited to, an additive manufacturing method (e.g., 3D printing).

In addition, in one embodiment, the plastic optical fiber 210 can be in the form of a structure that is formed of different laminating layers and thus can be considered to be a laminated structure. For example, instead of using conventional plastic optical fibers, the plastic optical fiber 210 can be made of transparent and opaque layers to form the laminated structure. It will be appreciated that the use of transparent and opaque layers in laminated form permits the laminated structure to selectively transmit or block light and can thus be used as a sensing technique. In addition, in areas in which transparency is desired, ultra-transparent nonophtonic material can be used. In other words, a nonmaterial can be used to construct one or more layers of the plastic optical fiber. The use of these advanced materials provides a higher level of integration instead of embedding commercial POF tubes within the pipeline.

Organic Electronic Sensory System

In yet another aspect, the system described herein can integrate the concept of an organic electronic sensory system by implementing charge transport concept in conjugated polymer systems which require selectivity of conductive/semiconducting polymers by applying intrinsically conducting polymers (organic polymers that conduct electricity) on the POF surface (electrical/optical dual functionality of POF). The electrical conductivity of these polymers is based on the presence of conjugated double bonds along the polymer backbone. Only when an electron is removed from the valence band by oxidation (p-doping) or added to the conducting band by reduction (n-doping) does the polymer become highly conductive.

In general, and as an example, an electronic element based on organic transistors can sense pressure and process the resulting signals in a similar way to neurons. For example, flexible sensors that respond to external stimuli through their transduction into electrical signals. In addition, systems can be devised to further process electrical signals and in particular, systems can be devised and based on two organic field-effect transistors, namely, a sensing transistor and a synaptic transistor.

The incorporation of a charge transport mechanism on the outside (outer surface) of the plastic optical fiber provides for additional functionality of the plastic optical fiber in that it adds an electrical functionality to the sensor aspect of the plastic optical fiber. As mentioned, traditional plastic optical fibers are not (electrically) conductive in d therefore, providing a conductive polymer material (e.g., a coating) on the plastic optical fibers provides a conductive pathway that can be used in the sensor application that requires electrical conduction. FIG. 1 generally shows a coating 15 which can represent the conductive polymer material. By providing this electrical functionality, the plastic optical fiber now has dual functionality in that the plastic optical fiber has both electrical/optical dual functionality. The coating 15 can completely cover the outer surface of the POF.

The incorporation of conductive polymer technology into plastic (polymer) optical fiber technology provides for a dual-function sensor that can be used in many different sensor settings including those described herein. As mentioned herein, optical fibers made of polymeric materials have the advantage of high flexibility and low stiffness compared to glass fibers. A couple of advantages make their application very attractive: they produce no heat, they are insensitive to electromagnetic radiation and they are not susceptible to electrical discharges.

Manufacturability to Provide Desired Functional Properties

As mentioned herein, the optical nerves (e.g., plastic optical fibers) that form part of the pipeline and convert it to a smart pipeline can be laid out across the pipeline in helical configuration to cover long distances circumferentially with minimum nerves implant.

As also mentioned, the system described herein can include a hybrid integration of electrical and optical nerves.

In yet another aspect, a nanomaterial functionalized coating can be applied to sense specific analyte gases and leverage the absorption characteristics of the nanomaterial. For example, the nonomaterial functionalized coating can be applied internally or can be applied externally to the fiber to sense the analyte gas or gases. Thus, if a leak occurs, this type of coating can act as a sensor for detection of the leak. One exemplary analyte gas that can be sensed is hydrogen. For ease of simplicity, FIG. 1 generally shows a coating 15 which can represent the nanomaterial coating.

As also mentioned, an applied Bragg Grated design can be incorporated in the POF design to sense strains, pressure change, leakage and crack propagation. As is known, a fiber Bragg grating (FBG) is an optical fiber in which the index of retraction within the core of the fiber changes along its length, from high-index to low-index. The modulation of the refractive index causes an FBG to act like a mirror that reflects certain wavelengths and transmits others. The wavelength that an FBG reflects depends on the spacing between the high index and low index regions within the fiber. The distance between two high-index regions within the fiber is called the "period of the FBG". The strength of the reflection depends on how large the index modulation is for the given construction. This modulation of the refractive index within an FBG can be a steady periodic change or a variable "quasi-periodic" change. If an FBG contains regions with, different periods, a single optical fiber can contain multiple mirrors causing different wavelengths of light to reflect from different positions along the fiber. The change in the period of the index modulation along the length of the fiber does not need to be abrupt.

In addition, the plastic optical fiber can be designed to have stretchability that can be used to detect mechanical strains. For example, the stretching of the plastic optical fiber can be used to detect mechanical strain exhibited along the pipeline. Strain is the deformation or displacement of material the results from an applies stress.

Distributed signal repeaters 11 (FIG. 2) can be implemented to amplify optical signals and cover long distances. As is known, a repeater is an electronic device that receives a signal and transmits it. Repeaters 11 are typically used to extend transmissions so that the signal can cover longer distances or be received on the other side of an obstruction. As a result, along the pipeline, one r more signal repeaters can be installed.

In another application, the present system can include an optical modulator device 13 (FIG. 2). The optical modulator device 13 comprises a device which can be used for manipulating a property of light-often of an optical beam, e.g., a laser beam. Depending on which property of light is controlled, modulators are called intensity modulators, phase modulators, polarization modulators, spatial light modulators, etc.

While FIG. 2 shows the use of both a signal repeater 11 and an optical modulator device 13, this is sake of convenience and it will be understood that the system does not need to have both members 11, 13 present at once. Instead, the system can use only one of members 11, 13.

Alternative Applications

It will also be appreciated that while the present system 100 is described in terms of its incorporation into a pipeline, the system can be implemented in other applications beyond pipelines. Broadly speaking, the sensing nerve network can be implemented in other structures and in particular, can be implemented in any plastic structure. For example, one other plastic structure that lends itself to application of the system 100 is a pallet that can be used to support and transport of goods. The system 100 can be used to sense an adverse event that is impacting the pallet. In other words, the system 100 can be used in an environment for sensing an event that impacts the article in which the system 100 is incorporated.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not precludes the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A pipe segment for use in construction of a pipeline comprising:
    a pipe body; and
    a sensing nerve network that is associated with the pipe body and is configured to monitor a condition of the pipe segment in real-time;
    wherein the sensing nerve network comprises optical nerves, electrical nerves or a combination thereof;
    wherein the sensing nerve network is part of a retrofitting article that is disposed internally within the pipe body against an inner surface thereof, the retrofitting article including an inflatable jacket that is inserted into the pipe body and the sensing nerve network is disposed along an outer surface of the inflatable jacket.

2. The pipe segment of claim 1, wherein the inflatable jacket has an annular shape with a center hole of the inflatable jacket defining a flow path for the pipe body.

3. The pipe segment of claim 1, wherein the inflatable jacket comprises an inflatable rubber jacket that sandwiches the sensing nerve network between the inflatable jacket and the pipe body.

4. The pipe segment of claim 1, wherein the sensing nerve network is configured for real-time monitoring and measurement of measurement of stress, strain, pressure, liquid level, vibration, displacement, tilt, and temperature of at least one of the pipe body and surrounding environment.

5. The pipe segment of claim 1, wherein the optical nerves comprise plastic or glass optical fibers.

6. The pipe segment of claim 1, wherein the electrical nerves comprises coaxial transmission lines.

7. A pipe segment for use in construction of a pipeline comprising:
- a pipe body; and
- a sensing nerve network that is associated with the pipe body and is configured to monitor a condition of the pipe segment in real-time;
- wherein the sensing nerve network comprises optical nerves, electrical nerves or a combination thereof;

wherein the optical nerves comprise plastic optical nerves and the sensing nerve network comprises an organic electronic sensory system that includes a charge transport mechanism in the form of a conductive polymer coating that is disposed along an outermost surface of each of the plastic optical nerves to provide electrical functionality to the plastic optical nerve.

8. The pipe segment of claim 7, wherein the pipe body comprises a non-metallic hollow pipe body that comprises a reinforced thermoplastic pipe.

9. The pipe segment of claim 8, wherein an outer layer of the reinforced thermoplastic pipe comprises a reinforcing layer, the sensing nerve network being disposed about the reinforcing layer.

10. The pipe segment of claim 7, further including an outer shield that is disposed over the sensing nerve network that surrounds the pipe body.

11. The pipe segment of claim 7, wherein the sensing nerve network is in communication with a main controller that is in the form of an above ground interrogating station and readout unit that is wirelessly connected to operators through IoT protocol.

* * * * *